United States Patent [19] [11] 4,143,678
Sugimura et al. [45] Mar. 13, 1979

[54] BLADDER TYPE ACCUMULATOR HOUSING A GAS BOMBE IN ITS GAS CHAMBER

[76] Inventors: Nobuyuki Sugimura; Kazuo Sugimura, both of 308 Mabase, Shimizu, Shizuoka, Japan

[21] Appl. No.: 846,783

[22] Filed: Oct. 31, 1977

[30] Foreign Application Priority Data

Nov. 4, 1976 [JP] Japan .................................. 51-13350

[51] Int. Cl.² ........................ F16L 55/02; F16L 55/04
[52] U.S. Cl. ..................................... 138/30; 141/19; 220/85 B
[58] Field of Search .......................... 138/26, 30, 178; 141/19; 220/85 B

[56] References Cited

U.S. PATENT DOCUMENTS

| 2,552,857 | 5/1951 | Knapp | 141/19 X |
| 2,557,120 | 6/1951 | Knoblock | 141/19 X |
| 2,659,629 | 11/1953 | Graham | 141/19 |
| 2,702,600 | 2/1955 | Allen | 141/19 X |
| 2,808,080 | 10/1957 | Dion-Biro | 141/19 |
| 3,834,433 | 9/1974 | Thompson | 141/19 X |

Primary Examiner—Richard E. Aegerter
Assistant Examiner—James E. Bryant, III
Attorney, Agent, or Firm—Ira Milton Jones & Associates

[57] ABSTRACT

In a bladder type accumulator the interior of which is divided by an expandable bladder into a gas chamber and a liquid chamber, a cartridge filled with gas is housed in said gas chamber, said cartridge is provided with a perforation means at its top for allowing pressure gas to flow out from said cartridge. During storage of the accumulator the cartridge is kept tightly closed so that the bladder remains relaxed and pressure of gas remains unchanged.

4 Claims, 4 Drawing Figures

BLADDER TYPE ACCUMULATOR HOUSING A GAS BOMBE IN ITS GAS CHAMBER

This invention relates to accumulators to be used in association with various kinds of pressure liquid apparatus and is more particularly concerned with bladder type accumulators having a pressure vessel which is divided by an elastic bladder into a liquid chamber and a gas chamber, and a liquid port is provided in a part of the pressure vessel.

A conventional type accumulator currently in use includes a pressure vessel in which is provided a gas bladder filled with pressure gas. Pressure liquid is maintained between the pressure vessel and the bladder.

Before such an accumulator is used in association with pressure liquid apparatus, the bladder is usually kept filled with gas so that the accumulator is ready for immediate use. However with this, it often happens that not only does pressure gas tend to leak from the rubber bladder due to its gas permeability, thus reducing the predetermined gas pressure, but the bladder is also caused to be worn or to lose its strength as a result of unrecoverable distortion owing to the bladder being left in its expanded state for a long time. For avoiding such faults in this kind of accumulator, the bladder should not be kept filled with gas, and when it is put in use the user should provide another gas filling device apart from the accumulator. However this is very inconvenient.

One object of the present invention is to furnish an accumulator for which it is not necessary that users employ a particular gas filling device.

Another object of the present invention is to furnish an accumulator having a gas bladder that is not subjected to wear or loss of strength before the accumulator is put into use.

Still another object of the present invention is to furnish an accumulator having a pressure gas cartridge housed in its bladder, wherein the cartridge is never opened by any accident or error.

A further object of the present invention is to furnish an accumulator of a type in which there is no troublesome means for releasing gas from the bladder or filling gas into the bladder and which is always kept in the state to be immediately operated.

To achieve the above stated objects an accumulator of the present invention comprises a pressure vessel that has its interior divided into a gas chamber and a liquid chamber by means of an expandable bladder that houses a cartridge filled with pressure gas and a perforation means is provided above the top of the cartridge for allowing the pressure gas therein to flow into the bladder. Said perforation means includes a piercing portion driven by a screw or the like to be directed to penetrate a top thin wall portion of the cartridge to open it.

In another embodiment, a cartridge is likewise housed in a bladder, and there is provided a removable arrester ring between a perforating screw means and the pressure vessel so that discharge of the cartridge by any accident or error is prevented during the time that the accumulator is not in operation.

Other features and objects of the invention will be better understood from the following description of the embodiments illustrated in the accompanying drawings, in which.

Figure 1:
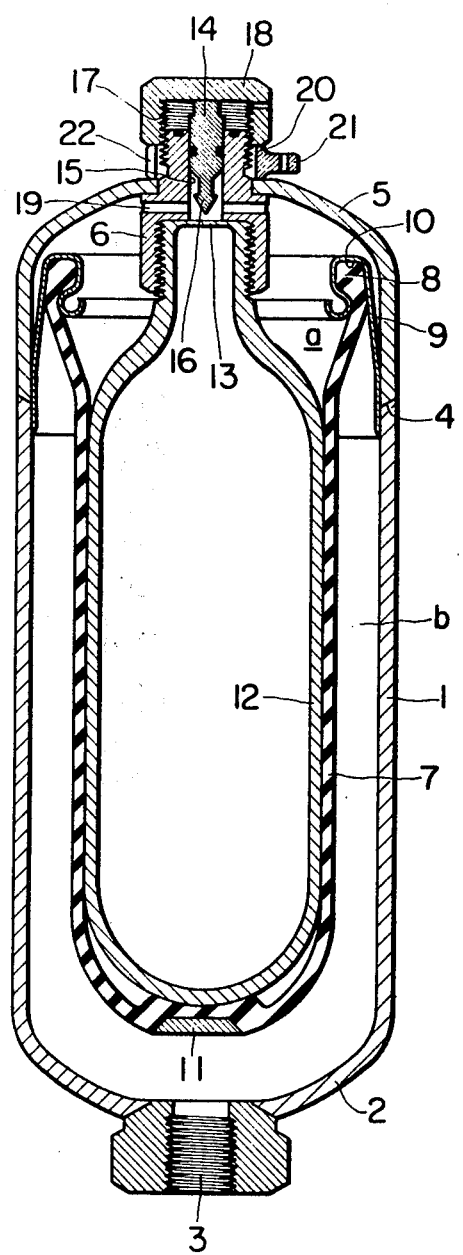
FIG. 1 is a longitudinal section view of one embodiment of an accumulator constructed in accordance with the present invention showing the accumulator in the condition in which it is stored prior to being put into use.
Figure 2:
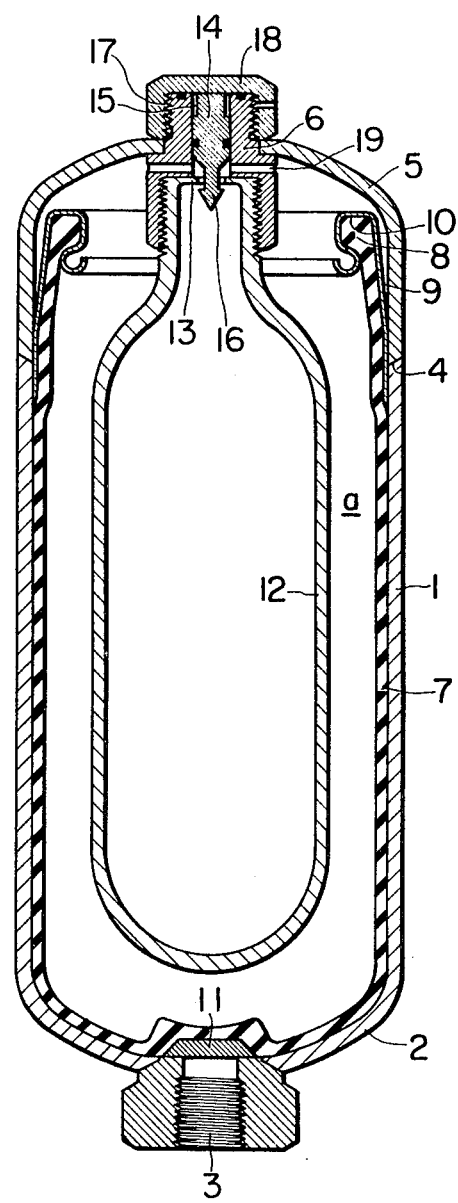
FIG. 2 is a longitudinal section view of the accumulator of FIG. 1 showing the accumulator in its condition for use.

In FIG. 1 and FIG. 2, 1 is a cylindrical pressure vessel made of metal or other material suitable to meet the pressure to be applied. In the center of its curved bottom 2 there is provided a port 3 for fluid to flow in and out and the top end of the pressure vessel is welded or otherwise connected along a joint line 4 with a lid body 5 made of the same material as the pressure vessel 1. The upper part of the lid body 5 is also curved, and in its center there is secured a plug 6 for airtightly supporting a gas bombe or cartridge later described. 7 is a bladder made of natural or synthetic rubber. The bladder 7 is shaped generally like an open bag, and its upper edge forms a flange portion 8 to be received in a groove 10 of a metal annular supporting member 9 welded to the upper end of the pressure vessel 1, for suspending said bladder 7 in the vessel 1. Thus the interior of the vessel is divided by the bladder into a gas chamber a and, at the outside of the bladder, a liquid chamber b. 11 is a valve plate provided at the bottom of the bladder 7. When the bladder expands, the valve plate 11 closes the liquid port 3 formed in the bottom of the pressure vessel 1 and prevents the bladder from being drawn into the port 3.

12 is a gas bombe or cartridge made of metal that is non-permeable to gas that is under pressure in its interior. The cartridge 12 is suspended at the open side of the bladder 7 with its upper end threadedly engaged with the plug 6. The top wall 13 of the cartridge 12 is made thin to be easily perforated by pressure imparted to a piercing member 14. This piercing member 14 is made of hard material such as annealed steel and engaged in a hole 15 in the plug 6 to be normally located just above the thin wall 13 of the cartrige 12. The lower end of the piercing member 14 is formed as a barbed tip 16, and its upper end projects above the plug 6 to abut against a cap screw 18 engaged with outside threads 17 on the plug 6. 19 is an aperture in the outside wall of the plug 6 through which pressure gas can enter the bladder 7 when the cartridge 12 is opened.

Figure 3:
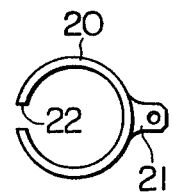
FIG. 3 is a plan view of an arrester for a cap screw of the accumulator of the present invention.

20 is an arrester removablly placed between the underside of the cap screw 18 and the top of the vessel 1. As seen in FIG. 3, this arrester 20 is formed as a ring having a lug 21 and a split 22. When this arrester 20 is interposed between the cap screw 18 and the vessel 1, screwing of the cap screw 18 in a downward direction, with the vessel oriented as in FIG. 1, is impeded, so that the cartridge 12 will never be opened by any accident.

In the accumulator of the type shown in FIG. 1, the cartridge 12 is filled with gas (Na gas as an example) of specified pressure and, with its top end supported by the thread of the supporting plug 6, the cartridge is maintained in the center of the lid body 5. Thus the cartridge 12 is housed in the gas chamber a of the bladder 7. After the cartridge is attached, the lid body 5 is put on the vessel 1, along with the attached supporter metal 9, in the groove 10 of which the flange 8 of the bladder 7 has been inserted. Thus the cartridge 12 is housed in the air chamber a of the bladder 7 as shown in FIG. 1. As the joint edge 4 of the pressure vessel 1 is abutted to the lower edge of the lid body 5, the supporter metal 9 is welded as a liner of this welded portion.

When the accumulator is kept in the warehouse before it is used, the arrester ring 20 in FIG. 3 remains between the cap screw 18 and the pressure vessel 1. Therefore in case anyone tries in error to turn the cap screw 18, it would not turn so that the piercing member 14 can not break the frangible top wall 13 of the cartridge 12. Thus the gas is maintained under predetermined pressure in the nonpermeable bombe. Also as the bladder 7 is not subjected to any distortion, its strength and elasticity will remain unchanged.

When the accumulator which has been kept in such state is to be used, firstly the arrester 20 is pulled off by means of lug 21. Then the cap screw 18 is screwed downward thereby the piercing member 14 is caused to exert a force to break through the thin top wall portion 13 of the cartridge 12 with its barbed tip 16. Then the pressure gas in the cartridge is instantly exhausted through the ruptured frangible wall 13 and the aperture 19 of the plug 6, into the bladder 7. With this, the bladder 7 is gradually expanded to the predetermined pressure to be in the state to allow the accumulator to operate.

Figure 4:
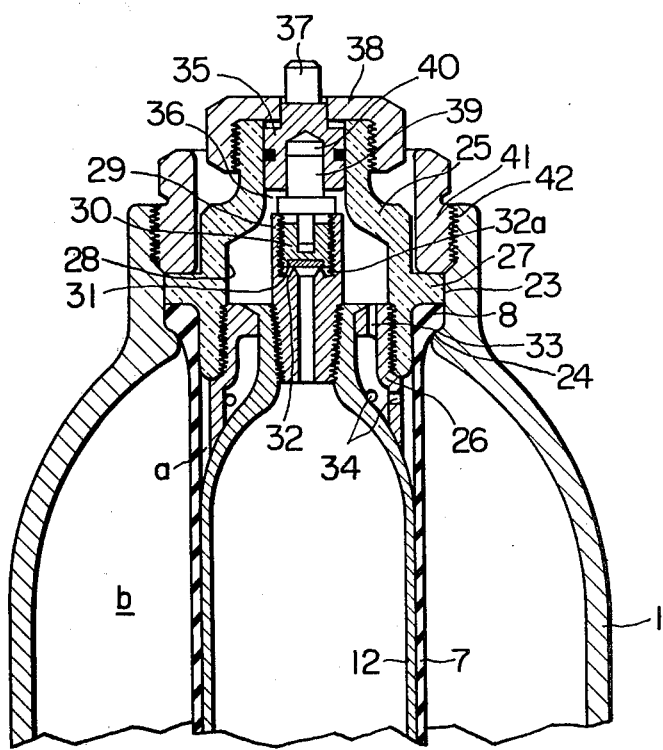
FIG. 4 is a fragmentary section view of a modified embodiment of the accumulator of this invention.

In FIG. 4, there is shown another accumulator that is partly modified in comparison to that of FIG. 1. Therein the opening 23 at the top end of the pressure vessel 1 is of somewhat larger diameter and in its inside an annular step 24 is provided on which the flange 8 of bladder 7 is supported to be secured in the pressure vessel 1. With this bladder 7 the pressure vessel 1 is divided into a gas chamber a and liquid chamber b. 25 is a plug to close the opening of the pressure vessel 1, and to its lower portion 26 the upper end of a cartridge 12 is secured. Thereabove is formed an outwardly projecting flange 27 to hold the flange 8 of the bladder 7. In the interior 28 of the plug there is provided a valve 29 connected to the gas cartridge 12. To this valve 29, a valve element 30 is threadedly engaged. When the valve element 30 is raised, the seal face 31 gets away from the seat 32 to open the cartridge 12 so that pressure gas therein is allowed to flow through an aperture 32a provided in the valve 29 and chambers 33, 34 provided in the cartridge supporting portion 26, into the bladder 7. 35 is an actuating element for turning the threaded valve body 30 engaged to the valve 29. To turn this, a tool receiving member 37 projects from the cap 38 of the plug 25, and in its lower part a square hole 40 is formed to receive a square stud 39 projecting from the upper part of the valve body 30.

41 is a ring nut screw that is engaged with the internally threaded portion 42 of the opening 23 of the pressure vessel 1. As this ring nut is tightened, the projected flange 27 of the plug 25 is forced down to thereby compress the flanged portion 8 of the bladder 7 tightly between the projected flange 27 and annular step 24, to secure the bladder 7 with an airtight seal.

In assembling this accumulator, the bladder 7 is put in the pressure vessel 1 through its opening 23. After the flange portion 8 of the bladder is supported on the annular step 24 of the vessel 1, the plug 25 that suspends the filled gas cartridge 12 is engaged in the opening 23 whereby the cartridge 12 is housed in the gas chamber a of the bladder 7. Thus the opening 23 of the pressure vessel 1 is closed, and in this state the ring nut 41 is engaged to the thread 42 of the opening 23 so that flange 27 of the plug 25 is pressed down to airtightly secure the bladder 7. Thus the bladder type accumulator as seen in FIG. 4 is constructed.

When this accumulator is to be stored in a warehouse, unless the actuating element 35 of the valve body 30 that closes the gas cartridge 12 is turned with a tool such as a spanner, the valve body 30 remains unmoved. Therefore since the cartridge 12 is never opened, the pressure gas is kept in the non-permeable cartridge 12 without any leakage. Thus the gas can keep its predetermined pressure during the storage of the accumulator and the strength and elasticity of the bladder remains unchanged.

When such an accumulator is to be used, the member 37 of handling element 35 is turned with a spanner and thereby the valve body 30 is screwed up to be away from the valve seat 32 to open the gas cartridge. Then pressure gas flows out through the aperture 32a and channels 33, 34 in the cartridge supporting portion, and 26 into the bladder so that the bladder is quickly expanded with pressure gas to place the accumulator in the state to operate.

What is claimed is:

1. An accumulator of the type comprising a rigid pressure vessel in which there are a pair of substantially opposite openings and in which there is a substantially elastic bladder that divides the interior of the pressure vessel into a liquid compartment with which one of said openings communicates and a pressure gas compartment that is sealed from said liquid compartment, said accumulator being characterized by:

A. the bladder being substantially in the form of an open bag that is sealed around its edge to the inner surface of the pressure vessel, in surrounding relation to said other opening, the bladder being so disposed that in its relaxed condition it extends away from said other opening;

B. a rigid gas cartridge in which there is a supply of gas under pressure, said cartridge having a wall portion that is normally closed but can be opened to permit the escape of gas from the cartridge;

C. connection means received in said other opening in the pressure vessel and cooperating with the pressure vessel and with the cartridge to support the cartridge within the bladder with said wall portion of the cartridge adjacent to said other opening and substantially aligned with an axis of said other opening that extends to the interior and to the exterior of the pressure vessel, said connection means providing a passage through which gas from the interior of the cartridge, flowing out of the cartridge upon opening of said wall portion, can enter the gas compartment inside the bladder; and D. a cartridge opening device mounted in said other opening in the pressure vessel, said cartridge opening device being movable in a direction parallel to said axis and having (1) an outer actuating portion accessible at the exterior of the pressure vessel by which motion in said direction can be imparted to the cartridge opening device, (2) an inner portion adjacent to said wall portion of the cartridge and which normally permits said wall portion of the cartridge to remain closed but effects opening of said wall portion in consequence of motion in said directon, and (3) means cooperable with relatively fixed means on the pressure vessel to provide a seal at said other opening in the pressure vessel whereby gas from the cartridge is confined to the pressure gas compartment.

2. The accumulator of claim 1 wherein said wall portion of the cartridge comprises a frangible wall portion and wherein said inner portion of the opening device comprises a piercing element which punctures said frangible wall portion upon motion of the opening device in a direction inwardly of the pressure vessel.

3. The accumulator of claim 1 wherein said wall portion of the cartridge comprises a seat for a normally closed valve and wherein said inner portion of the opening device effects opening of said valve upon movement of the opening device in said one direction.

4. The accumulator of claim 3 wherein said inner portion of the opening device comprises a valve element cooperable with said seat to normally maintain said wall portion closed and moves out of engagement with said seat upon motion of the opening device in a direction outwardly of the pressure vessel.

* * * * *

UNITED STATES PATENT OFFICE
CERTIFICATE OF CORRECTION

Patent No. 4,143,678      Dated March 13, 1979

Inventor(s) SUGIMURA ET AL

It is certified that error appears in the above-identified patent and that said Letters Patent are hereby corrected as shown below:

| | | |
|---|---|---|
| Col. 2: | Line 27, | "a" should be underscored (second occurrence) |
| | Line 28, | "b" should be underscored |
| | Line 63, | "a" should be underscored |
| | Line 68, | "a" should be underscored |
| Col. 3: | Line 33, | "a" (second occurrence) and "b" should be underscored |
| | Line 65, | "a" should be underscored |
| Col. 4: | Line 16, | the number "12" should follow the word "cartridge" |
| | Lines 18 and 19, | "portion, and 26" should read --portion 26, and-- |

Signed and Sealed this

Third Day of July 1979

[SEAL]

Attest:

Attesting Officer

LUTRELLE F. PARKER
*Acting Commissioner of Patents and Trademarks*